(12) United States Patent
Ulichney et al.

(10) Patent No.: US 10,362,194 B2
(45) Date of Patent: Jul. 23, 2019

(54) RECURSIVE HALFTONING AND GRAY VALUE SUBSTITUTION

(71) Applicant: Hewlett-Packard Development Company, L.P., Houston, TX (US)

(72) Inventors: Robert Ulichney, Stow, MA (US); Matthew D Gaubatz, Seattle, WA (US); Stephen Pollard, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 10 days.

(21) Appl. No.: 15/545,712

(22) PCT Filed: Feb. 27, 2015

(86) PCT No.: PCT/US2015/017960
§ 371 (c)(1),
(2) Date: Jul. 23, 2017

(87) PCT Pub. No.: WO2016/137483
PCT Pub. Date: Sep. 1, 2016

(65) Prior Publication Data
US 2018/0013921 A1    Jan. 11, 2018

(51) Int. Cl.
*H04N 1/405* (2006.01)
*H04N 1/52* (2006.01)
*H04N 1/60* (2006.01)

(52) U.S. Cl.
CPC ............ *H04N 1/4055* (2013.01); *H04N 1/52* (2013.01); *H04N 1/6022* (2013.01); *H04N 2201/0082* (2013.01)

(58) Field of Classification Search
CPC ......... H04N 2201/0082; H04N 1/4055; H04N 1/52; H04N 1/6022
USPC .................................. 358/3.06, 1.9, 1.15
See application file for complete search history.

(56) References Cited

U.S. PATENT DOCUMENTS

| 5,153,418 | A | 10/1992 | Batterman et al. |
| 6,798,538 | B1 | 9/2004 | Yamada et al. |
| 7,673,807 | B2 | 3/2010 | Simske et al. |
| 8,439,275 | B2 | 5/2013 | Cok |
| 8,820,628 | B2 | 9/2014 | McKinnon |
| 2003/0133163 | A1 | 7/2003 | Wang et al. |
| 2007/0143737 | A1 | 6/2007 | Huang et al. |
| 2010/0098329 | A1 | 4/2010 | Jang et al. |
| 2011/0013803 | A1 | 1/2011 | Au et al. |
| 2011/0069328 | A1 | 3/2011 | Ulichney et al. |
| 2014/0111831 | A1 | 4/2014 | Ulichney et al. |

(Continued)

OTHER PUBLICATIONS

Mukherjee, M et al, "A Multiresolution Halftoning Algorithm for Progressive Display", Apr. 4, 2005.

(Continued)

*Primary Examiner* — Quang N Vo
(74) *Attorney, Agent, or Firm* — HP Inc. Patent Department

(57) ABSTRACT

An example system in accordance with an aspect of the present disclosure includes a halftone engine and a gray value engine. The halftone engine is to apply halftoning to an image recursively across a plurality of levels of image scales and spatial resolutions, to generate a pattern that is at least quasi-periodic across the plurality of levels. The gray value engine is to substitute gray values recursively for at least a portion of the halftoning.

20 Claims, 8 Drawing Sheets

(56) References Cited

U.S. PATENT DOCUMENTS

2015/0220823 A1\* 8/2015 Ulichney ............... H04N 1/405
358/3.06
2015/0222788 A1\* 8/2015 Chandu .............. H04N 1/40087
358/3.06

OTHER PUBLICATIONS

Pollard, Stephen et al: "Forensic Authentication of Data Bearing Halftones Forensic Authentication of Data Bearing Halftones", VISIGRAPP 2013, Feb. 21, 2013 (Feb. 21, 2013), pp. 1-5.
Ulichney, Robert et al: "Encoding Information in Clustered-Dot Halftones Encoding Information in Clustered-Dot Halftones", The 26th International Conference on Digital Printing Technologies, Sep. 19, 2018, pp. 1-5.

\* cited by examiner

RECURSIVE HALFTONING AND GRAY VALUE SUBSTITUTION

BACKGROUND

Data-bearing mark technologies, such as barcodes, have a finite range in which a capture device, such as a smartphone camera, can successfully detect and recover the data. Multiple versions of the data-bearing mark (i.e., various sizes of the image) may be placed next to each other to cover multiple ranges of distances.

BRIEF DESCRIPTION OF THE DRAWINGS/FIGURES

DETAILED DESCRIPTION

Examples described herein relate to multiscale patterns, which can cover and provide functionality over multiple distance ranges using a single image/pattern. The pattern may rely on halftones, and may include periodic and/or quasi-periodic structure for detection by an image capturing system (not shown). The pattern may be contained in a stegatone that can be recovered from imagery represented at multiple resolutions. Thus, the pattern can be read from a much wider range of distances, compared to a single-scale data-bearing mark. Applications include large signage or posters, where a user can access the multiscale mark from a number of distances. The pattern may be used in data bearing marks, as well as non-data bearing marks that can be used for image-based range finding. A range of design parameters can customize the appearance of the multiscale stegatone.

Figure 1:
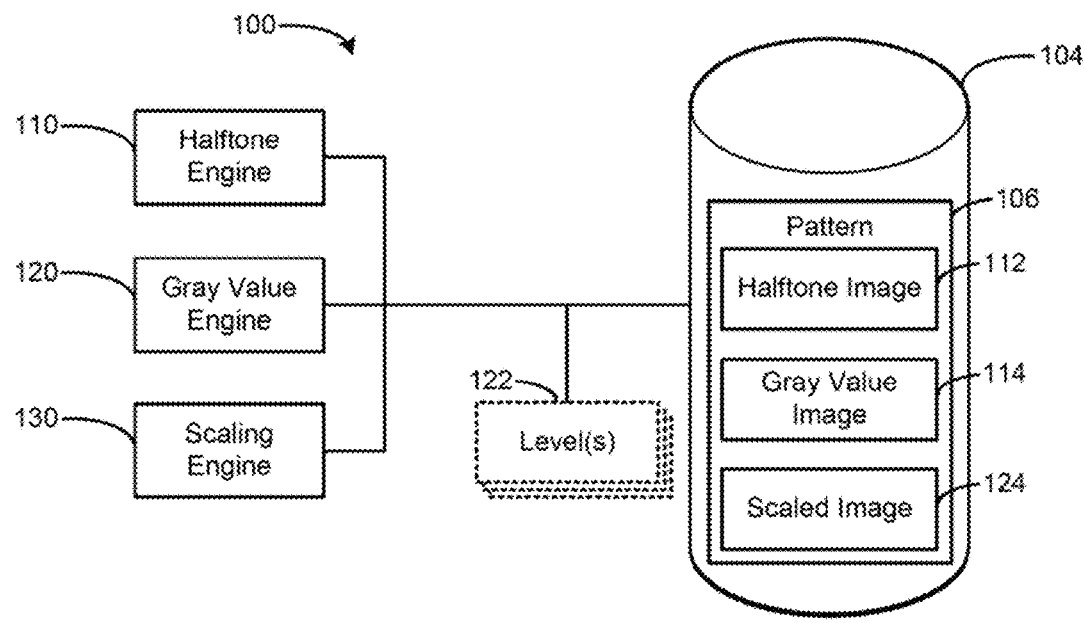
FIG. 1 is a block diagram of a system including a halftone engine, a gray value engine, and a scaling engine according to an example.

As used herein, a stegatone is a clustered-dot halftone where data is embedded by shifting individual clusters, introducing perturbations that encode data. Data can be extracted from the stegatone using a stegatone recovery system. A multiscale stegatone includes different resolution levels, spaced so that at a given distance, or distance level, the dot clusters for that level can be detected by the recovery system. Data is represented by shifts of tones, providing aesthetically pleasing images unlike a barcode. Examples described herein also may apply to non-data-bearing marks, such as range finder targets. Thus, examples are not limited to the concept of stegatones. The term stegatone is short for steganographic halftone, FIG. 1 is a block diagram of a system 100 including a halftone engine 110, a gray value engine 120, and scaling engine 130 according to an example. The engines 110, 120, 130 are to interact with a halftone image 112, a gray value image 114, and a scaled image 124 associated with a pattern 106 and a level 122. The images 112, 114, 124 and other information may be stored on a storage 104.

The halftone engine 110 may perform functions related to producing a halftone image 112 for a given level 122. The gray value engine 120 may perform functions related to producing a gray value image 114 for a given level 122. The scaling engine 130 may perform functions related to producing a scaled image 124 for a given level 122.

The gray value engine 120 may use various techniques, such as substitution of grayscale values in an input image. The gray value engine 120 may operate on a portion of an image, such as substituting gray values for a portion of the colors (e.g., just the black colors) or a portion of an area of a halftone image 112. As to specific values of the substitute gray values used, the gray value engine 120 may vary the values according to what type of halftone symbols into which those gray values will eventually render. For example, it may be desirable for the gray value engine 120 to avoid applying gray values to the white space in a large-scale text-based logo pattern 106 at a first level 122, to enhance visibility and readability of the logo (e.g., to enable users to better see the letters from a distance). In the case of a range-finding pattern 106 (e.g., one that is not meant for a user to visually see a logo or shape), the gray value engine 120 may generate the pattern 106 as a checkerboard by choosing not to halftone the white spaces between black squares, and substituting a 50% gray value to the blacks. As a matter of convention, white has been chosen to represent a 0% gray value, and black has been chosen to represent a 100% gray value.

The scaling engine 130 may produce a scaled image 124 for a given level 122 by scaling an image from a previous level 122. As to a scale used when scaling between levels, the scale may be chosen so that a pattern 106 may be detected by a frequency detection means (that looks for a characteristic peak in the frequency domain) at a given range of distances corresponding to a level and associated scale. A frequency-domain method for mobile detection may be used to determine the presence of images with appropriately rendered patterns, so the scale (S) can depend on the usable range of peak locations in the discrete Fourier transform. Thus, the range of distances at which a visual detector may reliably detect a pattern 106 may be used to establish how the scaling engine 130 may scale images, i.e., choosing what the scale (S) should be between levels 122. For example, a relatively larger scale may result in a recursive set of patterns 106 for which a given detector may have gaps in detection between levels 122, where a user would need to move closer or farther away to detect the pattern 106 if sitting at the distance corresponding to a gap. If a relatively smaller scale is used, the ranges of distance for visual detection may overlap excessively, resulting in inefficiency and/or waste. Thus, the scale factor S, between levels, may be chosen by the scaling engine 130 as part of a design specification, to be large enough to optimize the separation of the distance ranges, but small enough to avoid excessive distance gaps moving from one distance/level to the next. In alternate examples, the scale may be user-specified according to design choice (e.g., targeting a specific set of mobile phone capabilities).

Similar to scale, the number of level(s) 122 may be chosen to correspond to a number of different distance ranges from which pattern 106 may be accessible, i.e., visually ascertainable by a recovery system such as a camera, range finder, and so on. The pattern 106 may be produced from the use of halftone images 112, gray value images 114, and scaled images 124 being manipulated by the halftone engine 110, gray value engine 120, and scaling engine 130. For a targeted distance range corresponding to a level 122, the system 100 may output a bitonal halftone image 112 for that level 122, which may be used for range finding (and/or from which data may be recovered, in the case of a stegatone). Level 1 is used herein as the largest and lowest-resolution version to be read from the most distant position. Level 2 is a higher-resolution version for the next closer distance, and so on up to a maximum ($L_{max}$) number of levels.

System 100 may use, as initial input, a "mule" (i.e., used to carry information) gray value image 114, and produce as final output a bitonal multiscale stegatone. Thus, an input image (initial input or iterative input) may be referred to herein as a mule image. The pattern 106 may be formed in the final output by iteratively applying the halftone engine 110, gray value engine 120, and scaling engine 130 across the plurality of levels 122. The iterative use of the engines 110-130 may generate corresponding images 112, 114, and 124. The gray value image 114 may be used as initial input, and an iteration may produce another gray value image 114 to be used as input for the next iteration.

In the case of using video capture of a multiscale stegatone from mobile devices at close focus, single pixel shifts up to a printed resolution on the order of approximately 600 dots per in (dpi) can be recovered. Accordingly, for printers exceeding such resolution, pixel replication can be used to render the highest scale in the recoverable range of the intended visual recovery system(s). For example, printing on an 800 dpi printer may use pixel replication by a scale factor of 2 to render a printed image resolution of 400 dpi. LaserJet and Inkjet printers having resolution of 1200 dpi may pixel replicate by a scale factor of 3 to render a resolution of 400 dpi. Scaling may be performed by pixel replication or other techniques, and is not limited to integer scale factors or pixel-based image representations.

Storage 104 may be accessible by the system 100, to serve as a computer-readable repository to store information such as images 112, 114, 124 for a given pattern 106 and/or level 122, that may be referenced by the engines 110, 120, 130 during operation of the engines 110, 120, 130. As described herein, the term "engine" may include electronic circuitry for implementing functionality consistent with disclosed examples. For example, engines 110, 120, and 130 (and other engines not specifically illustrated in FIG. 1) represent combinations of hardware devices (e.g., processor and/or memory) and programming to implement the functionality consistent with disclosed implementations. In examples, the programming for the engines may be processor-executable instructions stored on a non-transitory machine-readable storage media, and the hardware for the engines may include a processing resource to execute those instructions. An example system (e.g., a computing device), such as system 100, may include and/or receive the tangible non-transitory computer-readable media storing the set of computer-readable instructions. As used herein, a processor/processing resource may include one or a plurality of processors, such as in a parallel processing system, to execute the processor-executable instructions. The memory can include memory addressable by the processor for execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

In some examples, the functionality of engines 110, 120, 130 may correspond to operations performed in response to, e.g., information from storage 104, user interaction, and so on. The storage 104 may be accessible by the system 100 as a computer-readable storage media, in which to store items in a format that may be accessible by the engines 110, 120, 130.

Figure 2:
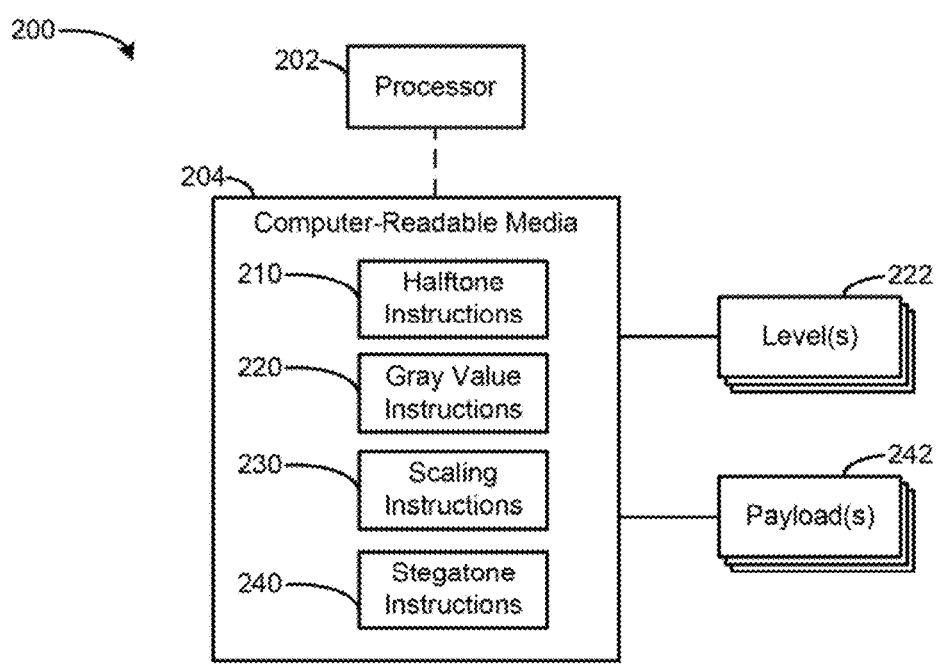
FIG. 2 is a block diagram of a system including halftone instructions, gray value instructions, scaling instructions, and stegatone instructions according to an example.

FIG. 2 is a block diagram of a system 200 including halftone instructions 210, gray value instructions 220, scaling instructions 230, and stegatone instructions 240 according to an example. The computer-readable media 204 includes the instructions 210-240, and is associated with a processor 202, level(s) 222, and payload(s) 242. In some examples, operations performed when instructions 210-230 are executed by processor 202 may correspond to the functionality of engines 110-130 of FIG. 1. The stegatone instructions 240 may be used to encode payload(s) 242 into the pattern 106 and/or images 112, 114, 124 shown in FIG. 1. Thus, the stegatone instructions 240 may correspond to a stegatone engine (not specifically shown in FIG. 1) that may be included in the computing system 100 of FIG. 1. In FIG. 2, the operations performed when halftone instructions 210 are executed by processor 202 may correspond to functionality of halftone engine 110 (FIG. 1). Similarly, the operations performed when gray value instructions 220 and scaling instructions 230 are executed by processor 202 may correspond, respectively to functionality of gray value engine 120 and scaling engine 130 (FIG. 1). Operations performed when stegatone instructions 240 are executed by processor 202 may correspond to functionality of a stegatone engine (not specifically shown in FIG. 1) that may be included in system 100 of FIG. 1.

As set forth above with respect to FIG. 1, engines 110, 120, 130 may include combinations of hardware and programming. Such components may be implemented in a number of fashions. For example, the programming may be processor-executable instructions stored on tangible, non-transitory computer-readable media 204 and the hardware may include processor 202 for executing those instructions 210-240. Processor 202 may, for example, include one or multiple processors. Such multiple processors may be integrated in a single device or distributed across devices. Media 204 may store program instructions, that when executed by processor 202, implement system 100 of FIG. 1. Media 204 may be integrated in the same device as processor 202, or it may be separate and accessible to that device and processor 202.

In some examples, program instructions can be part of an installation package that when installed can be executed by processor 202 to implement system 100. In this case, media 204 may be a portable media such as a CD, DVD, flash drive, or a memory maintained by a server from which the installation package can be downloaded and installed. In another example, the program instructions may be part of an application or applications already installed. Here, media 204 can include integrated memory such as a hard drive, solid state drive, or the like. While in FIG. 2, media 204 includes instructions 210-240, one or more instructions may be located remotely from media 204. Conversely, although FIG. 2 illustrates level(s) 222 and payload(s) 242 located separate from media 204, such information (and other related information) may be included with media 204.

The computer-readable media 204 may provide volatile storage, e.g., random access memory for execution of instructions. The computer-readable media 204 also may provide non-volatile storage, e.g., hard disk or solid state disk for storage. Components of FIG. 2 may be stored in any type of computer-readable media, whether volatile or non-volatile. Content stored on media 204 may include images, text, executable files, scripts, or other content that may be used by examples as set forth below. For example, media 204 may contain configuration information or other information that may be used by engines 110-130 and/or instructions 210-240 to provide control or other information.

Examples provided herein may be implemented in hardware, programming, or a combination of both. Example systems can include a processor and memory resources for executing instructions stored in a tangible non-transitory computer-readable media (e.g., volatile memory, non-volatile memory, and/or computer-readable media). Non-transitory computer-readable media can be tangible and have computer-readable instructions stored thereon that are executable by a processor to implement examples according to the present disclosure. The term "engine" as used herein may include electronic circuitry for implementing functionality consistent with disclosed examples. For example, engines 110-130 of FIG. 1 (and other engines described herein) may represent combinations of hardware devices and programming to implement the functionality consistent with disclosed implementations. In some examples, the functionality of engines may correspond to operations performed by user actions, such as selecting steps to be executed by processor 202 (described above with respect to FIG. 2).

Figure 3:
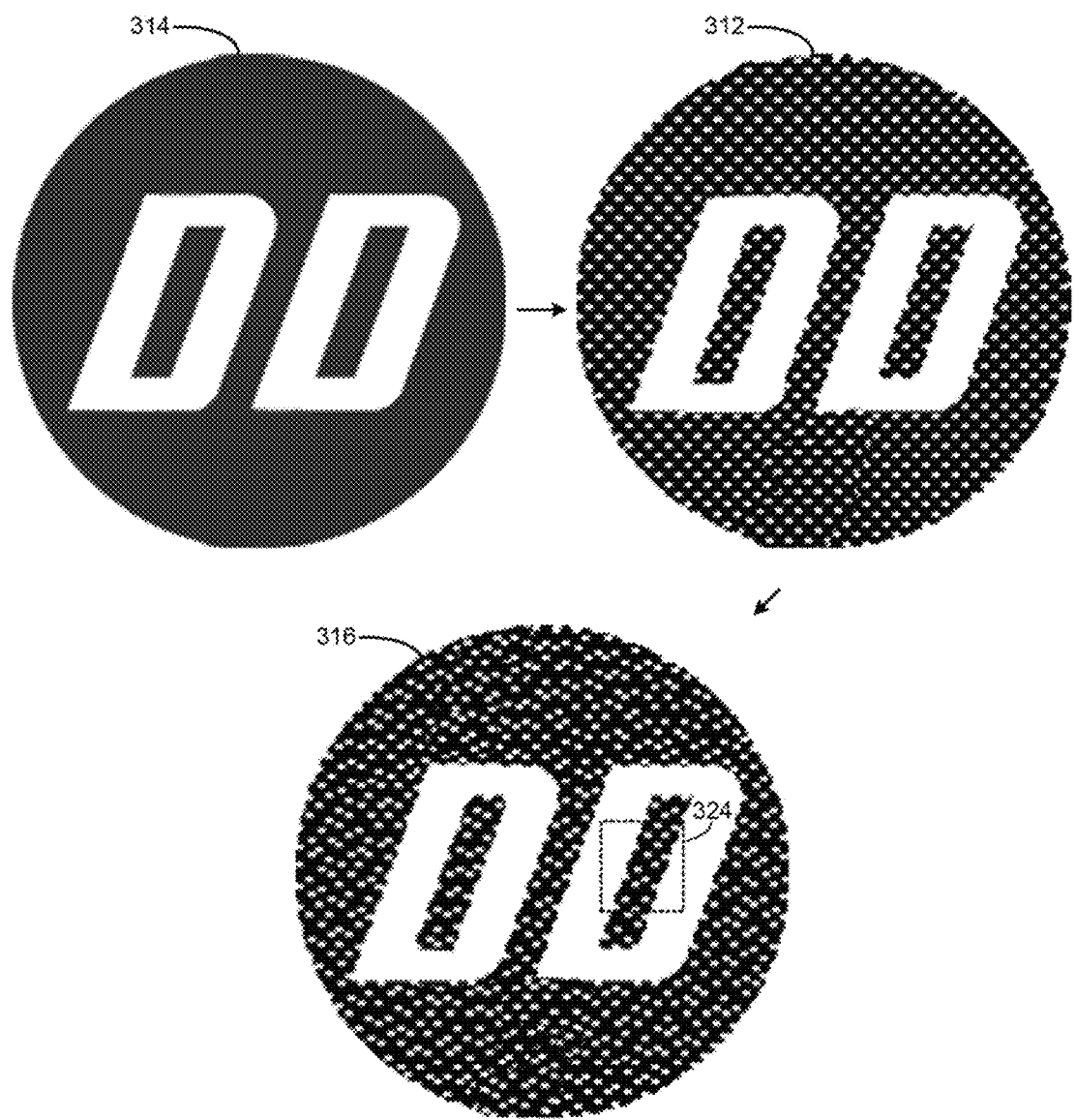
FIG. 3 is an illustration of a gray value image, a halftone image, and a stegatone.

FIG. 3 is an illustration of a gray value image 314, a halftone image 312, and a stegatone 316. The gray value image 314 may serve as a level 1 input mule image, and is used (e.g., by a halftone engine) to generate the halftone image 312. The halftone image 312 may serve as a reference halftone, used (e.g., by a stegatone engine) to generate the stegatone 316. Thus, FIG. 3 illustrates the generation of level 1 stegatone 316. The stegatone 316 could then be used (e.g., by a halftone engine) as input to generate a gray value image for the next level/iteration (e.g., for a level 2 stegatone as described with reference to portion 324 in FIG. 4).

Various types of images may serve as the input mule gray value image 314, and example images are not limited to text-based logos as illustrated. Preferably, the input mule image is provided in a format compatible with being halftoned. FIG. 3 illustrates a simple input logo having two gray levels, where the text is shown in a light color and the surrounding background is a dark color.

To create the reference halftone image 312, halftoning may be selectively applied (e.g., by a halftone engine) to a portion of the gray value image 314. Accordingly, for enhanced contrast and readability in the example of FIG. 3, the light-colored text portion of the gray value image 314 has been treated as white for this first level/iteration, such that the application of halftoning results in a solid white interior of the text (i.e., no halftone symbols/cells inside the white text). The surrounding background is subjected to halftoning, creating a white and black pattern approximating the dark gray value of the gray value image 314. Later iterations/levels subsequently can substitute a light gray value for the white portions in FIG. 3, whereby the light gray values may be halftoned at other levels to include a pattern.

To create the stegatone 316, coding may be used (e.g., by a stegatone engine) to apply a payload of data/information to the halftone image 312, As illustrated, the payload has been encoded based on single-pixel shifts of halftone clusters in the halftone image 312, resulting in the stegatone 316. Single- or multiple-pixel shifts, as well as single- or multiple-cell shifts, may be used to create the slight perturbations visible in the locations of the dot clusters in the halftone patterns of the halftone image 312. Such coding may result in periodic or quasi-periodic structures, which are visible and can be exploited for visual detection. The term quasi-periodic is used herein to mean that the pattern associated with an image has an overall two-dimensional periodic structure, although the individual marks within that periodic structure do have some small perturbations (the single-pixel shifts in stegatones to represent information/data).

The images 312-316 may be formed from a plurality of cells. For example, the halftone image 312 and the stegatone 316 may be formed of cells that are 4×4 pixels in size. The small white rectangles are located within areas that may be referred to as shadow cells formed in the dark background region of the image, comprising white clusters of 2×3 pixels in size in this example, within a 4×4 cell. Iteratively scaled images of higher levels also may be formed of cells, and a cell of a previous level/scale (referred to herein as a macrocell) may be formed of a plurality of cells from a subsequent level/scale. A cell also refers to a region containing clusters of pixels, e.g., when using cluster dot halftoning in laserjet or offset press printing etc. An arrangement of cells also may be referred to herein as a halftone screen, which is usually periodic and associated with a screen angle. As illustrated in FIG. 3, the stegatone 316 is generated based on the halftone image 312 that uses a classic 45 degree cluster dot halftone screen. In alternate examples, instead of using a cluster dot halftone screen having halftone clusters of pixels, an image or plurality of images may be used to replace a cluster of pixels.

The stegatone 316 may code information based on various technologies, including circular coding. Circular coding may be used to represent data in two dimensions, without a need for clearly-identifiable marks (e.g., fiducials) or other special signals, symbols, or codes to mark where a visual code begins or ends. By representing data in a circular fashion without needing to have fiducials or markers, data may be embedded in the stegatone 316 (illustrating a level 1 stegatone), including multiple layers of data as multiscale stegatones. Even when visually capturing just a small/cropped portion of an image (i.e., when a user stands close to the stegatone with a mobile phone camera), circular encoding enables the visual decoder to extract the data without a need to capture the entire image and associated fiducials.

As an alternative to data encoding, a visual image itself may be used recursively across the plurality of levels. For example, when iterating a higher level scale, a halftone cell may be replaced with an entire mule image. In the illustrated example logo of FIG. 3, the white dots would then be represented on the next level down as scaled versions of the logo itself. Such coding may be used because it makes use of a periodic or quasi-periodic nature, to be detectable visually.

Figure 4:
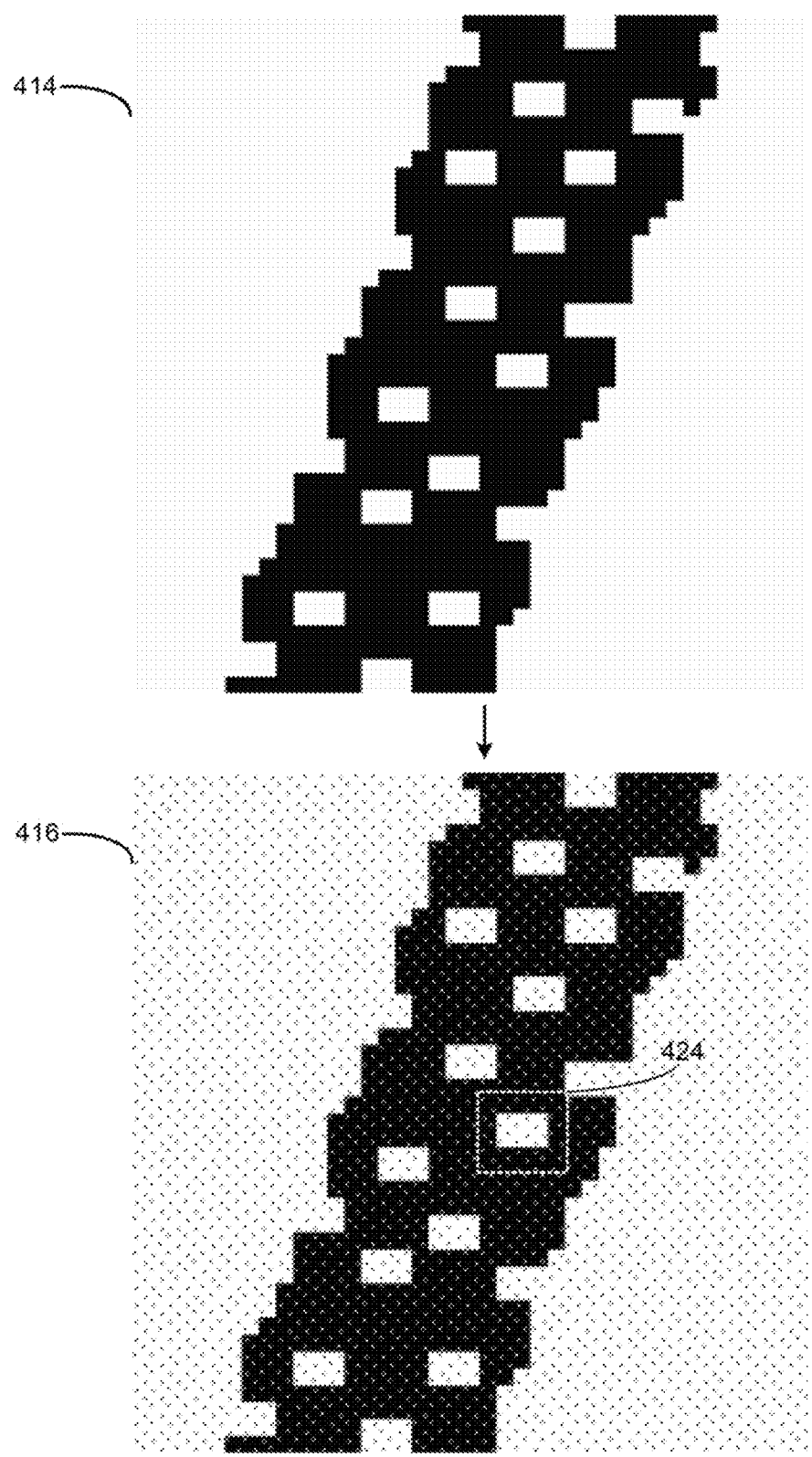
FIG. 4 is an illustration of the detail of a level 2 stegatone generated from a level 1 stegatone.

A portion 324 is indicated in the level 1 stegatone 316, whose scaled representation is used to further illustrate scaling and subsequent levels (see FIG. 4). Although just portion 324 is illustrated in FIG. 4 for convenience, the entire image (stegatone 316) is scaled up for further levels.

To generate an input mule gray value image for the next level, the black and white pixels of the bitonal stegatone 316 are to be substituted with gray values, then scaled by the factor S in both dimensions, as shown in FIG. 4.

FIG. 4 is an illustration of a gray value image 414 and a stegatone 416. The gray value image 414 illustrates the details of a level 2 mule image, cropped from portion 324 of FIG. 3, for generation of a level 2 stegatone 416 using the level 1 stegatone 316 of FIG. 3. The image has been enlarged (e.g., by a scaling engine) and converted to grayscale (e.g., by a gray value engine). Notably, an entire portion of the image has been substituted with gray values to generate the gray value image 414. Accordingly, the entire image has been halftoned, such that the background is not completely white. The formerly white portions are now replaced with light gray, eventually to become a visible halftone pattern. Thus, to form the level 2 input mule gray scale image 414, the stegatone engine has taken the solid black of the level 1 stegatone 316 of FIG. 3, and replaced it with a dark gray in the gray value image 414. The solid white of the level 1 stegatone 316 has been replaced with light gray. The choice of substituted gray values may be used to affect the size of the halftone clusters in the next level stegatone 416, and also may be based on the dither threshold array used to generate the reference halftone (not shown in FIG. 4) from the gray value image 414. Accordingly, the portion of the image to which halftoning (or other adjustments) is applied may refer to adjusting a portion of the colors (i.e., adjusting the dark portions, or adjusting the light portions), and/or may apply to adjusting a portion of an area of the image (e.g., applying halftone to the solid text portions while avoiding the white space between the text, and so on).

The gray value image 414 may be generated, and then a scaling engine may scale the gray value image 414, For the sake of convenience, a scale factor of S=8 has been used in the illustrated example, as a consequence of the halftone cells being 4×4 pixels in size (i.e., to promote scaling by whole number multiples of cell dimensions, to better facilitate scaling via pixel replication). In alternate examples, the scale factor can be any number, and the resampling method can be any method besides pixel replication. Pixel replication scaling has been used, e.g., to maintain in a current level the crisp edges of the stegatone from a previous level.

The stegatone 416 is a level 2 stegatone building on the level 1 stegatone from FIG. 3. The stegatone 416 is obtained by using the mule gray value image 414 to generate a reference halftone (not shown in FIG. 4) that is then embedded with a payload according to the stegatone generation process to generate the bitonal level 2 stegatone 416.

Figure 5:
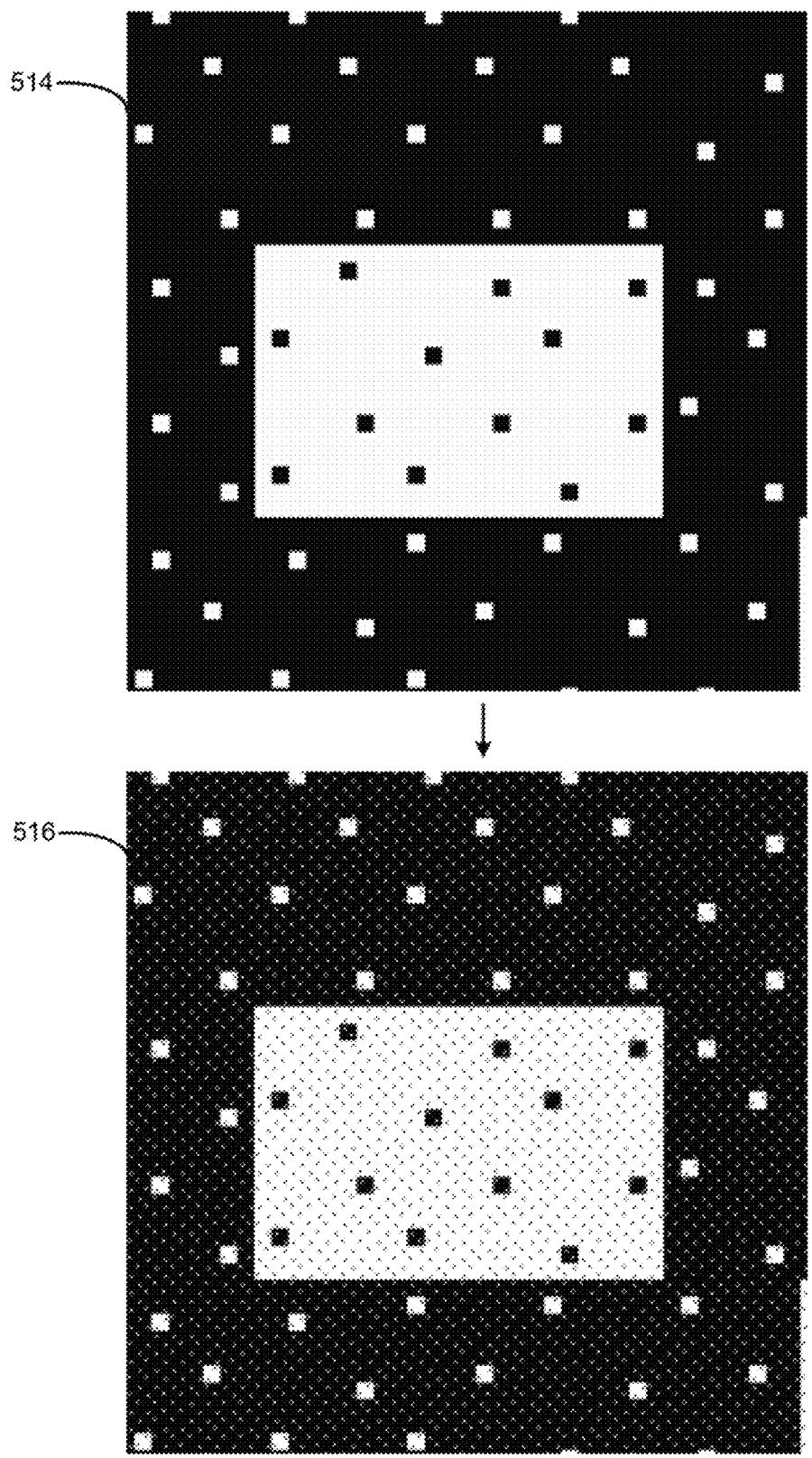
FIG. 5 is an illustration of the detail of a level 3 stegatone generated from a level 2 stegatone.

A portion 424 is indicated in the level 2 stegatone 416, whose scaled representation is used to further illustrate scaling and subsequent levels (see FIG. 5). As before, the scaling is applied to the entire original image, but for the sake of convenience, only a portion is used for illustrative purposes.

Figure 6:
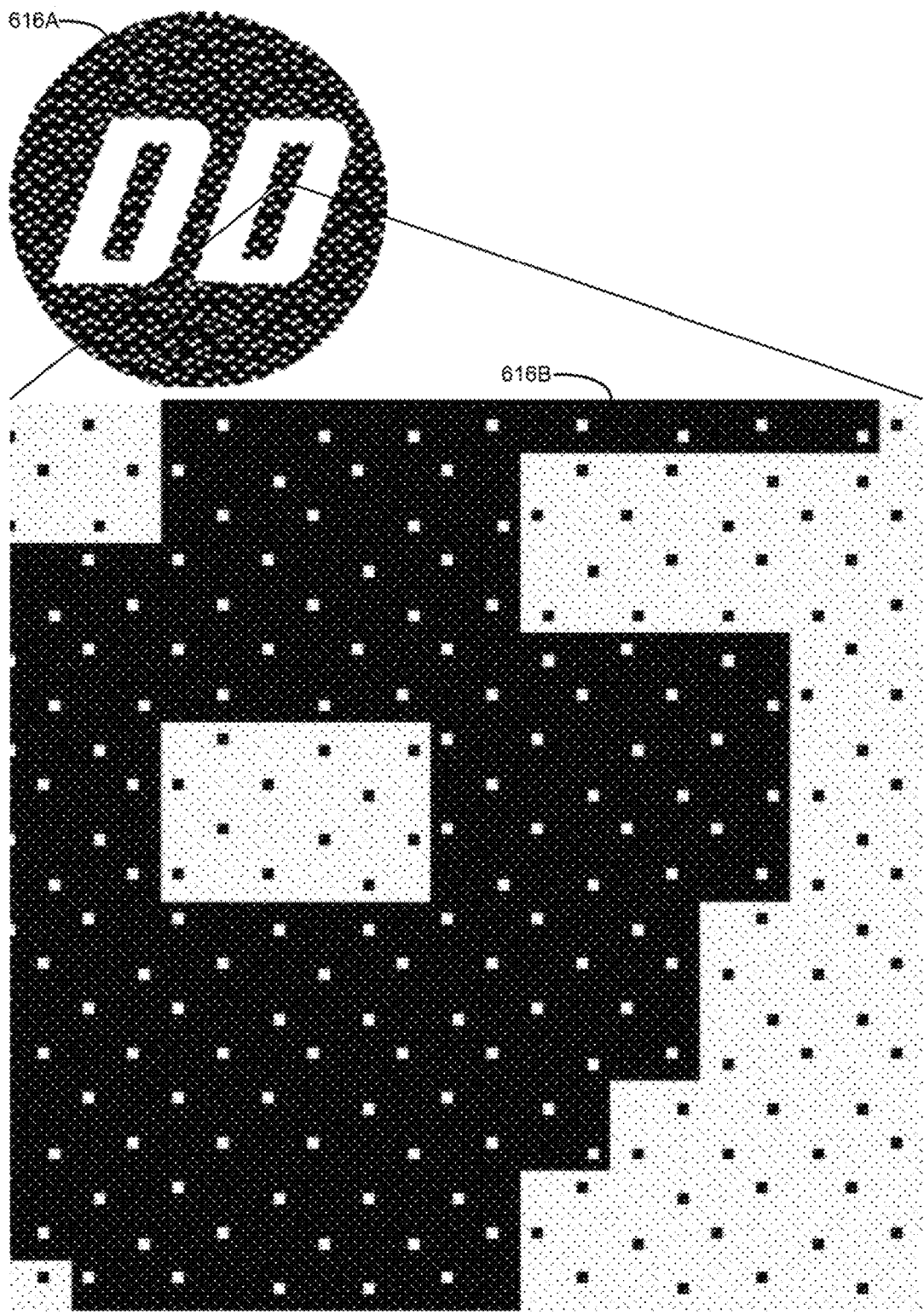
FIG. 6 is an illustration of a level 3 stegatone at different viewing distances.

FIG. 5 is an illustration of a gray value image 514 and a stegatone 516. FIG. 5 illustrates the generation of a level 3 stegatone, based on using the level 2 stegatone 416 from FIG. 4. The gray value image 514 may serve as a level 3 mule, derived from the portion 424 of FIG. 4. The gray value image 514 illustrates an altered version of the level 2 stegatone 416 of FIG. 4, in which grayscale values have been slightly varied and the image scaled. The level 3 input mule gray value image 514 and the level 3 stegatone 516 illustrate the portion 424, which was cropped around the original 2×3 pixel white cluster from the level 1 stegatone 316 of FIG. 3. FIG. 5 also illustrates the effect of the chosen scale S =8 between levels 1-to-2 and 2-to-3, whereby a single pixel from the level 1 stegatone 316 is now represented by 64×64 pixels in the level 3 stegatone 516 (i.e., the scale factor of 8 being applied twice results in an overall scale factor of $8^2$=64). Additionally, an originally 100% white pixel of the level 1 stegatone 316 has been diluted with 6% (i.e., 248 pixels/4096 pixels) of black pixels in the level 3 stegatone 516. Similarly, an originally 100% black pixel of level 1 stegatone 316 now contains 6% white pixels in the representation of the level 3 stegatone 516. The dilution factor could be greater, if the gray value engine were to choose substituted gray values to be more toward a middle gray, which would result in larger halftone cluster sizes. The design tradeoff is to set the halftone clusters small enough to minimize color dilution (and thus maximize contrast and detectability of the lower-level representations), while keeping the halftone clusters large enough to enhance detectability of the higher levels, especially for the highest-resolution levels where printed dot gain can render the clusters unreadable if the clusters are too small. Additionally, the substitute gray values can be chosen as different values between levels. In the illustrated example of FIGS. 2-4, three levels are shown ($L_{max}$=3), so the output stegatone 516 is a level 3 multiscale stegatone (as shown in FIG. 6, 616A at a size where the level 1 structure is evident in the entire image, but the small 6% dilution in contrast of the black and white portions are also apparent in the zoomed-in portion view of 616B). In alternate examples, further levels may be rendered, and/or fewer levels also may be used to create the patterns.

FIG. 6 is an illustration of a level 3 stegatone 616A, 616B at different view sizes, Stegatone 616A illustrates a complete three-level multiscale stegatone, as shown in further detail at 616B. The multiscale stegatone 616A may be used with an image-based range finder, and different data/payloads may be coded at each level (e.g., to specify the resolution and halftone cell size of the target, providing information used for proper distance recovery). Thus, a stegatone 616A also may serve as a range finding target.

Figure 7:
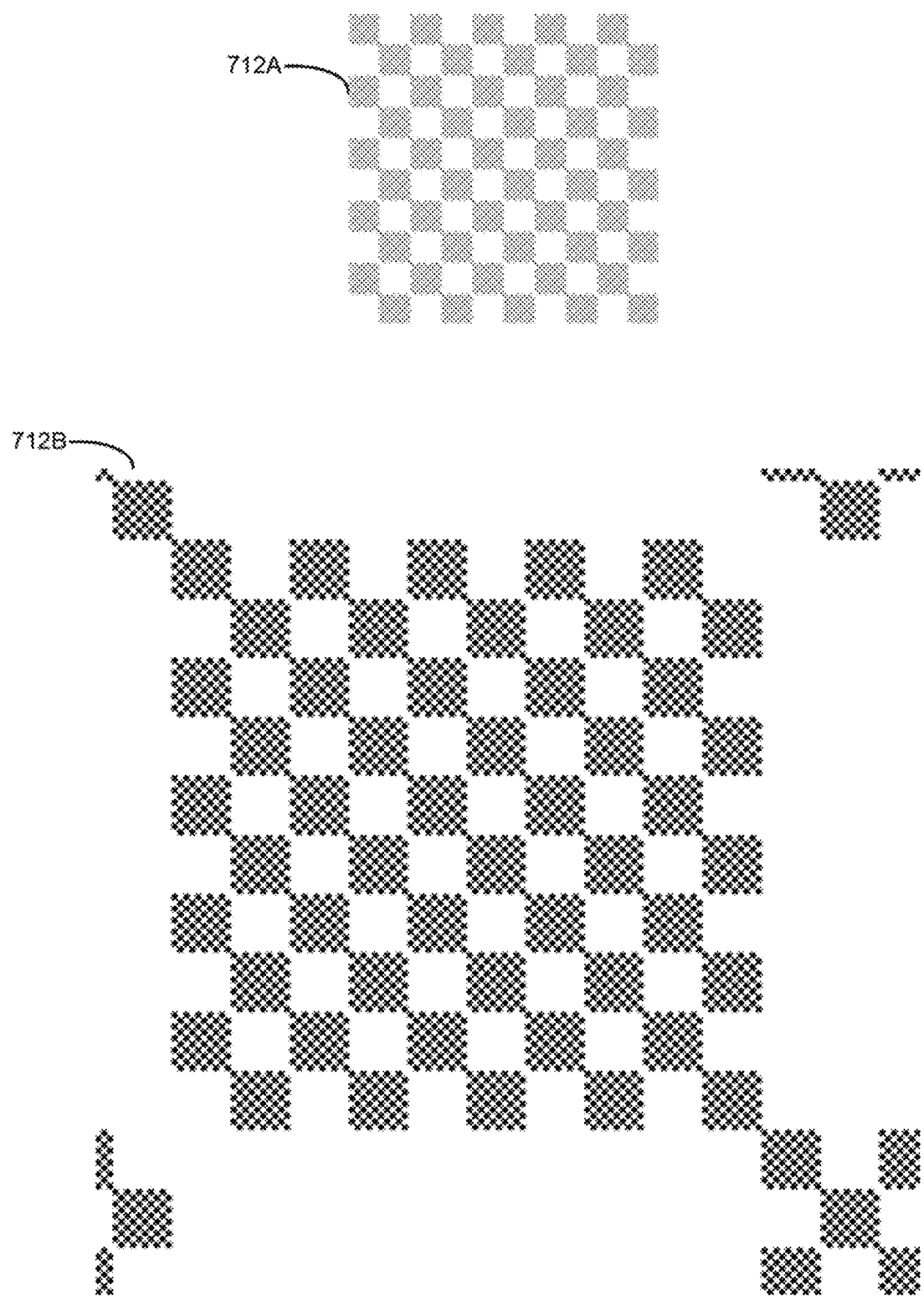
FIG. 7 is an illustration of a multiscale non-data-bearing halftone image at different scales.
Figure 8:
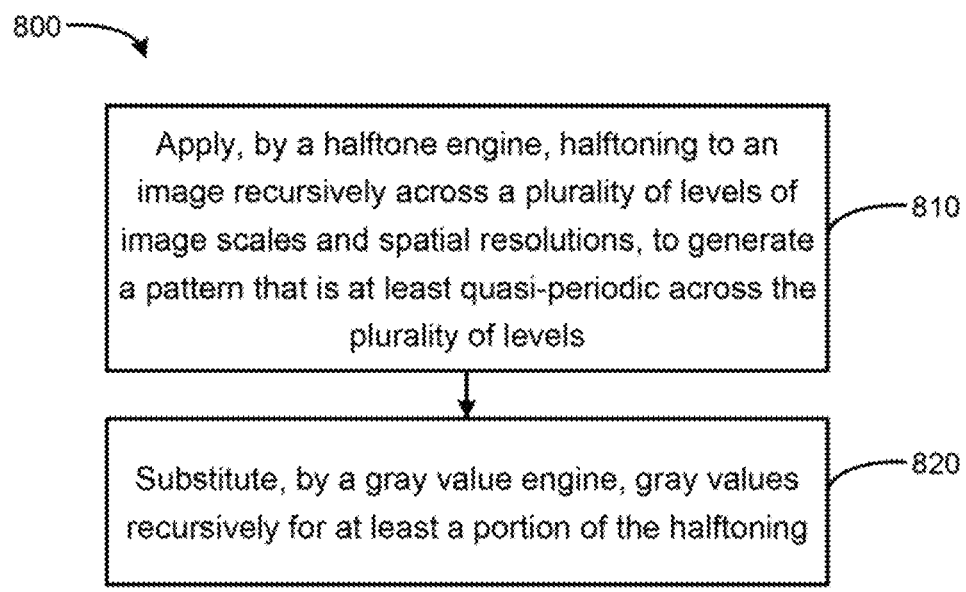
FIG. 8 is a flow chart of an example process for applying halftoning recursively and substituting gray values recursively.

FIG. 7 is an illustration of a halftone image 712A, 712B at different scales. Halftone image 712A illustrates a complete image showing the pattern as a first level structure. Halftone image 712B illustrates details of a third-level structure of the pattern revealed at a larger scale, e.g., corresponding to a closer distance to a range finder. FIG. 7 illustrates how the example approaches described herein may be used to generate a multilevel target that is not data bearing. The illustrated 3-level multiscale non-data-bearing visual target formed by the pattern shown in halftone images 712A, 712B are based on the use of a 50% gray value substitution to render a bitonal checkerboard pattern. Thus, images 712A, 712B may serve as a target created for an image-based range finder that does not read stegatone data. Its periodic nature is demonstrated by repetition of the checkerboard pattern, without slight perturbations in the halftone pixels. The stegatone approaches described above may be used, wherein the level 1 image (Mule(1), see FIG. 9) would be a 50% gray image as a halftone with no carrier cells. In other words, the pattern is created by omitting application of the stegatone engine and its associated payload coding perturbations to the halftone. FIG. 7 also illustrates substituting gray values for a portion of an image, by substituting a 50% gray value for the black pixels, and "substituting" white for the white pixels (i.e., leaving the white values unchanged). Accordingly, higher-level black regions would iteratively render as checkerboards. Setting scale S=10, the image could then serve as a target at distance ranges spanning recursively more orders-of-magnitude. In this case, the large halftone cluster sizes of the black pixels in the level 1 stegatone 712A are diluted with 75% white pixels, thereby affecting the apparent contrast. Despite such an effect, the contrast of the level 1 stegatone 712A is still sufficient at level 1 for visual detection and range finding. As set forth in further detail below, the example images of FIG. 7 may be generated using the flowchart of FIG. 9, e.g., by applying a 50% grayscale substitution to the black portion of the image (and not applying a grayscale substitution to the white portion), and by not obtaining a payload or encoding data to generate the stegatone, Referring to FIGS. 8 and 9, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated, FIG. 8 is a flow chart 800 of an example process for applying halftoning recursively and substituting gray values recursively. In block 810, halftoning is applied by a halftone engine to an image recursively across a plurality of levels of image scales and spatial resolutions, to generate a pattern that is at least quasi-periodic across the plurality of levels. For example, an input mule gray value image may be halftoned, then converted to grayscale for a given iteration, to be repeated by again halftoning the output from the previous level and grayscaling for the subsequent level. The plurality of levels correspond to different scales and distances from which the visual pattern may be recognized, such that a pattern may be multilevel, The quasi-periodic nature is revealed in slight perturbations of pixels of the halftone. In block 820, a gray value engine is to substitute gray values recursively for at least a portion of the halftoning. For example, the black portion of a range finding target may be set to a 50% grayscale, with the white portion remaining as solid white, as the halftoning and gray value substitutions are applied recursively for multiple levels.

Figure 9:
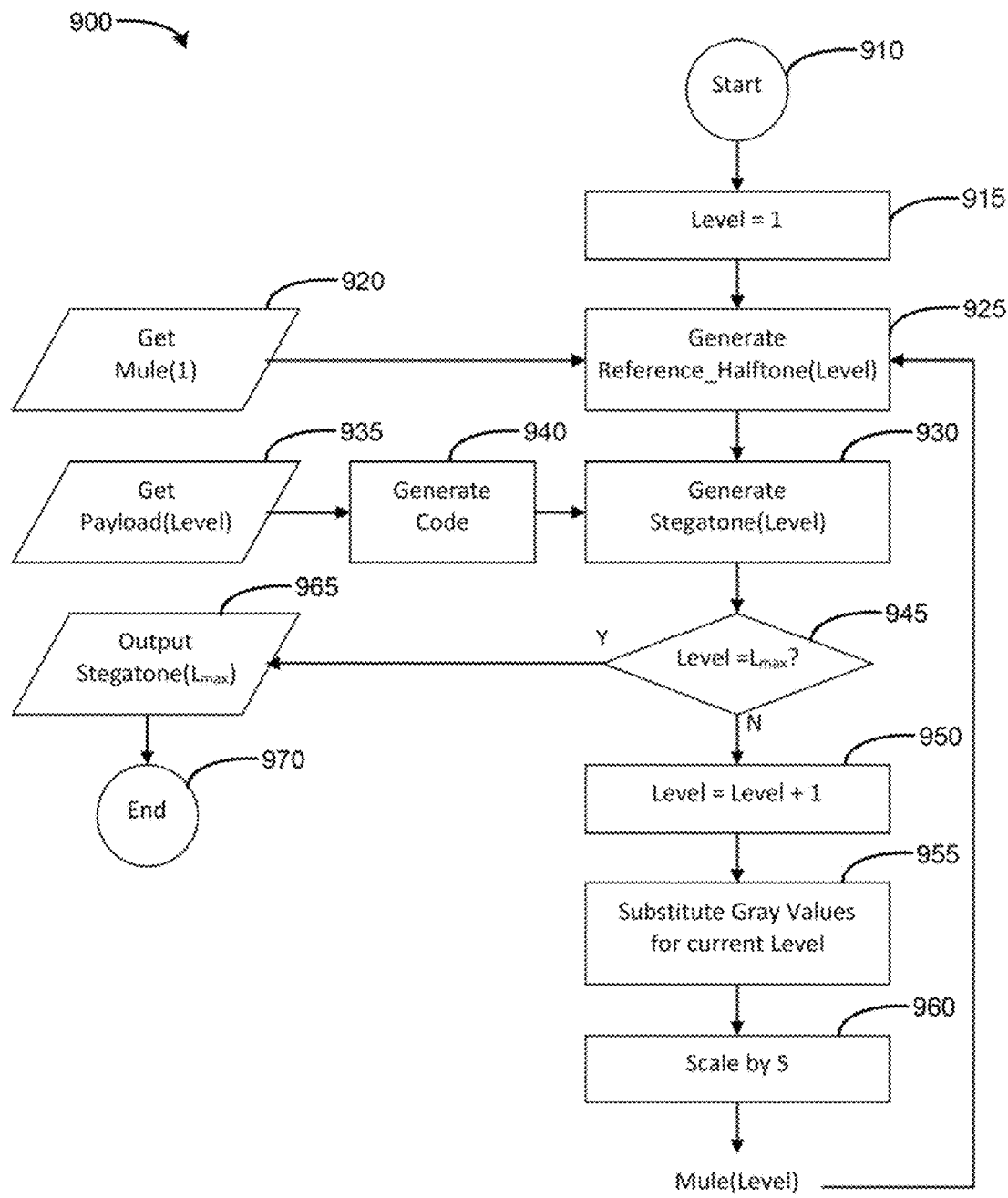
FIG. 9 is a flow chart of an example process for outputting a stegatone.

FIG. 9 is a flow chart 900 of an example process for outputting a stegatone. The process may be used by a multiscale stegatone generation system. Generally, the iterative approach illustrated may be used to construct a multiscale stegatone having a pattern that is visually decodable across multiple levels/distance ranges. The number of levels of the multiscale stegatone may be set by assigning the total number to $L_{max}$. For example, the illustrated multiscale stegatones of the various figures are shown for three levels, where $L_{max}=3$. The scale factor similarly may be assigned by setting the scale factor S. The same scale factor S may be used between the plurality of levels, and different scale factors may be used between different levels of a given multiscale stegatone. As set forth above, various scale factors have been illustrated, such as S=8 for FIGS. 3-6, and S=10 for FIG. 7. The scale factor that is chosen, e.g., by a scaling engine, may depend on factors such as the type of optical detection means (web camera, mobile phone camera, professional zoom camera, etc.) and the ability of a frequency-based peak detector to find quasi-periodic patterns within a certain range of distances associated with a given scale. A given scale may be associated with a finite range within which detection is possible for that scale, whereby multiple scales can provide a multiple of range of distances for continuous detectability and distance coverage.

The mule input gray value images for a given level are denoted Mule(Level). As used herein, the word mule is meant to describe an image that is carrying data, e.g., by coding the payload into a stegatone. However, because the process of FIG. 9 also may be used to generate non-data-carrying range finding targets, Mule(Level) also may refer to a target image that is non-data-bearing (e.g., by skipping blocks 930-940) which would automatically be done if none of the cells in the Reference Halftone are identified as data carriers. The mule image obtained may be a continuous-tone image used to generate a bitonal reference halftone image. At the largest scale/lowest level (1), Mule(1) is provided as an input to the system. For example, the Mule(1) could correspond to gray value image 314 of FIG. 3. A reference halftone is generated from the Mule input, denoted as Reference_Halftone(Level), In the case where a data-coded stegatone is to be generated, the data associated with the current level, denoted as Payload(Level), is embedded in this halftone (e.g., in the form of a circular code) based on shifting of halftone clustered dots. The result is a Stegatone (Level). By way of example, FIG. 3 illustrates the images corresponding to the Mule(1) 314, the Reference_Halftone (1) 312, and resultant Stegatone(1) 316.

More specifically, flow starts at block 910. In block 915, the level is set to 1, The (level) in parentheses indicates that the process may be applied recursively across multiple levels, and the first level is 1. In block 920, a mule image for the present level of 1 is obtained. For example, a level 1 gray value image will be the lowest resolution, coarsest image used as input. In block 925, a reference halftone for the present level (1) is generated. For example, the reference halftone may be based on a cluster dot 45 degree screen halftone of the gray value input image. In block 930, a stegatone for the present level (1) is generated. This may be based on obtaining a data/information payload for the present level (1) via block 935, and generating code per block 940 used to generate the corresponding stegatone at block 930. Thus, the payload may include data that is to be represented, and the payload can be different between levels for multiscale stegatones. For the iteration of level 1, the payload is obtained for level 1, a circular code may be generated for level 1, and that code is used to modify the Reference_Halftone(1), e.g., by pixel shifting the Reference_Halftone(1) to create a stegatone(1). In block 945, it is determined whether the present level (1) has reached a maximum level $L_{max}$. For example, for a three-level multiscale stegatone, $L_{max}=3$, the present level of 1 means that two additional recursive passes are to be performed. If the level has not yet reached the maximum level $L_{max}$, flow proceeds to block 950.

In block 950, the present level is incremented to a next level, e.g., the level number is incremented by one. In block 955, gray values are substituted for at least a portion of the black or white pixels of the present level (e.g., gray values for the level 2 pattern are generated based on input from a level 1 stegatone or reference halftone). For example, in the stegatone from level 1, a gray value engine may substitute the black and/or white values for gray levels, using a relatively darker gray for black pixels, and a relatively lighter gray for white pixels. In an example, the darker gray may have a gray value of 50% or greater, and the lighter gray may have a gray value of 50% or less. Design optimization dictates that the gray value used should not be too light or dark, to ensure contrast levels at different scales are visually detectable by anticipating the size of the halftone whose gray levels will be rendered into when generating the next level. In block 960, the working image (now a gray value image) is scaled by a factor of S. For example, it may be scaled according to the scale factor as set forth above with reference to earlier examples. The scale factor S may be chosen as an integer scale factor, which can be readily facilitated by pixel replicating the stegatone that has been gray-level substituted. The resulting scaled image may now serve as a new mule input gray value image for the (now incremented) current level, denoted by "Mule(Level)." The Mule(Level) is then used as the input mule gray value image for the next recursive iteration, according to which flow loops back to block 925 and a next level reference halftone is generated. The corresponding foregoing blocks described above (blocks 925-940) are recursively repeated, and again at block 945 it is determined whether the present level has reached $L_{max}$. If not, further iterations are performed (including blocks 920-960, for example). If, at block 945, the present level has reached $L_{max}$, then flow proceeds to block 965. In block 965, the resultant stegatone is output for the level $L_{max}$. For example, the system may produce the multilevel stegatone, which will be bitonal and readable from the number of levels and their corresponding different distances. Flow ends at block 970.

The process of FIG. 9 illustrates a broadness of applicability to targets such as those illustrated in FIG. 7, which are non-data-bearing. Accordingly, there would be no payload, and appropriate partial substitution of gray values (applied to black regions and not white regions) may be performed, with scaling by a factor of 10 (for making a symmetric order of magnitude multiscale range finding target). Such targets are periodic, for detection by visual capture systems that identify periodic structures corresponding to a scale/level and associated range of distances. Furthermore regarding the broadness of FIG. 9, for a given one of the different levels/scales, a completely different encoding or pixel shift rule may be used, such as what symbology convention is used for choosing what data is represented by the binary zeros and ones for a given level/scale of a quasi-periodic multiscale stegatone.

What is claimed is:

1. A computing system comprising:
    a halftone engine to apply halftoning to an input image to obtain a halftone image for a current level;
    a gray value engine to substitute gray values for at least a portion of the halftone image to obtain a gray value image for the incremented level; and
    a scaling engine to scale the gray value image to obtain a scaled image to serve as the input image for the halftone image at the incremented level;
    wherein the computing system is to recursively iterate applying halftoning, substituting gray values, and scaling for a plurality of levels, and
    wherein the computing system is to generate and output a pattern that is at least quasi-periodic and encodes a particular data payload at each of a plurality of different resolutions corresponding to the plurality of levels, the pattern being optically machine-readable to recover the corresponding data payload at each of the different resolutions.

2. The computing system of claim 1, further comprising a stegatone engine to encode at least one payload across a plurality of levels of the halftone image, to recursively generate a multiscale stegatone.

3. The computing system of claim 2, wherein the stegatone engine is to encode the at least one payload based on circular coding.

4. The computing system of claim 1, wherein the halftone engine is to replace a halftone cell with a cell image.

5. The computing system of claim 1, wherein the halftone engine is to identify the plurality of levels to include a level and associated spatial resolution corresponding to a spatial resolution capability of a printer to print the pattern.

6. The computing system of claim 1, wherein, for a given level, the gray value engine is to replace a white value of the halftone image with a gray value not greater than 50%, and replace a black value of the halftone image with a gray value not less than 50%.

7. The computing system of claim 1, wherein the scaling engine is to scale the gray value image according to a scale factor based on pixel replication.

8. The computing system of claim 1, further comprising an image-based range finder, the image-based range finder comprising:
    an optical system; and
    a range finder target, the target comprising the pattern to be placed at a location for which range measurement is to be determined using the optical system to read the data payload from the pattern at a resolution corresponding to the range between the optical system and range finder target.

9. The computing system of claim 8, wherein the pattern comprises a multiscale stegatone.

10. The computing system of claim 1, wherein the pattern comprises a bitonal image.

11. The computing system of claim 1, the computing system to encode a data payload into the pattern using circular coding.

12. The computing system of claim 1, the halftoning engine to replace a halftone cell with an entire copy of the input image.

13. A method, comprising:
    applying, by a halftone engine, halftoning to an image recursively across a plurality of levels of image scales and spatial resolutions, to generate a pattern that is at least quasi-periodic across the plurality of levels;
    substituting, by a gray value engine, gray values recursively for at least a portion of the halftoning; and
    outputting the pattern that is at least quasi-periodic and encodes a particular data payload at each of a plurality of different resolutions corresponding to the plurality of levels, the pattern being optically machine-readable to recover the corresponding data payload at each of the different resolutions.

14. The method of claim 13, further comprising encoding, by a stegatone engine, at least one payload across the plurality of levels of the image, to generate a multiscale stegatone.

15. The method of claim 13, further comprising encoding a plurality of different payloads across the plurality of levels.

16. The method of claim 13, further comprising encoding the payload based on applying perturbations to the halftone image, wherein the quasi-periodic nature of the pattern is preserved between levels, despite the non-periodic perturbations contained in a given level.

17. The method of claim 13, further comprising optically detecting a distance to the image based on visually identifying the pattern at a given level across the plurality of levels, and range finding according to a given range of distances corresponding to the given level.

18. A non-transitory machine-readable storage medium encoded with instructions executable by a computing system that, when executed, cause the computing system to:
    apply, by a halftone engine, halftoning to an input image to obtain a halftone image for a current level;

substitute, by a gray value engine, gray values for at least a portion of the halftone image to obtain a gray value image for an incremented level;

scale, by a scaling engine, the gray value image to obtain a scaled image to serve as the input image for the halftone image at the incremented level;

recursively iterate the applying, encoding, incrementing, substituting, and scaling for a plurality of levels, to generate a pattern that is at least quasi-periodic across the plurality of levels; and output the pattern that is at least quasi-periodic and encodes a particular data payload at each of a plurality of different resolutions corresponding to the plurality of levels, the pattern being optically machine-readable to recover the corresponding data payload at each of the different resolutions.

19. The storage medium of claim 18, further comprising instructions that cause the computing system to encode the at least one payload based on circular coding and applying non-periodic perturbations to the halftone image.

20. The storage medium of claim 18, further comprising instructions that cause the computing system to encode, by a stegatone engine, a payload for the current level of the halftone image.

* * * * *